: 3,751,442
EXTRACTION OF UNSAPONIFIABLE FRACTIONS FROM NATURAL FATS

Alain Rancurel, Chartres, France, assignor to Laboratoires Pharmascience
No Drawing. Filed June 28, 1971, Ser. No. 157,706
Claims priority, application France, July 2, 1970, 7024542
Int. Cl. C11b 1/10
U.S. Cl. 260—412.8     7 Claims

ABSTRACT OF THE DISCLOSURE

The invention relates to a new process for the extraction of the unsaponifiable fraction from natural fats.

The fat is treated with a solvent mixture which is practically insoluble in the fat, has the property of dissolving the unsaponifiable fraction and has a high vapour pressure, so that there are obtained a solvent fraction containing practically the whole of the unsaponifiable fraction of the original fat and the fat freed from the unsaponifiable fraction, the solvent mixture is evaporated from the concentrate, and the unsaponifiable fraction is extracted from the evaporation residue.

By this method, the fat freed from the unsaponifiable fraction but containing a substantial proportion of triglycerides may be recovered and used in the foodstuffs industry, the cosmetics industry, etc.

My invention relates to a process for extracting the unsaponifiable fraction from natural fats.

The conventional method of extracting the unsaponifiable constituents from fats consists of treating the fat with an alkaline liquor to split the triglyceride molecules into fatty acids and glycerol. The fatty acids liberated are thus converted into soaps and the unsaponifiable fraction which is present in the soapy solution can be extracted with a solvent. As a result of this treatment, the residue obtained is practically valueless. In other words, a considerable quantity of fat is sacrificed for the sake of obtaining a small proportion of unsaponifiable constituents. This contributes to the high cost of unsaponifiable fractions.

It is an object of my invention to provide a treatment of fats which, while enabling the unsaponifiable fraction to be extracted, has the advantage of preserving a considerable proportion of the triglycerides for subsequent use.

According to the invention, this is achieved by treating the fat with a mixture of solvents which is insoluble or very slightly soluble in the fat and which has the property of dissolving the unsaponifiable fraction and which has a sufficiently high vapour pressure to enable subsequent evaporation to be carried out at a low temperature so that there are obtained a concentrate which contains practically the whole of the unsaponifiable fraction of the original fats and a large fraction of the fat freed from its unsaponifiable fraction. The solvent mixture is evaporated from the concentrate, and the unsaponifiable fraction is extracted from the evaporation residue.

The fat which has been freed from its unsaponifiable fraction may then be recovered and used for cosmetics, foodstuffs and other purposes. Moreover, after evaporation the solvent mixture may be recovered for re-use in the extraction process. A further advantage of the process according to the invention compared with the processes previously employed is that by suitable choice of solvent mixture an unsaponifiable fraction can be obtained which is almost identical to that which would be obtained by direct saponification of the original fat.

The treatment of the fat with the solvent mixture is preferably carried out in a counter-current extractor of the liquid-liquid type.

Extraction of the unsaponifiable fraction from the evaporation residue which contains some triglycerides and practically all the original unsaponifiable fraction is carried out by conventional saponification processes which are well known in the art.

As already indicated above, the solvent mixture must obey three conditions. It must be insoluble or very slightly soluble in the fat which is being treated although it must be capable of dissolving the unsaponifiable fraction of the fat. It must also have a sufficiently high vapour pressure to facilitate subsequent evaporation. The mixture of solvents should therefore be chosen from those which are highly polar but which have a relatively high vapour pressure. When this selection has been made, successive tests are carried out on the given oil or other fat to determine which particular solvent mixture provides satisfactory results both technically and economically.

A mixture of solvents which gives particularly satisfactory results, particularly in the case of avocado oil is a mixture of methyl alcohol and benzene.

In order to obtain the most satisfactory results for each type of fat, mixtures of two or more polar solvents such as methanol, ethanol, isopropanol, furfural, furfurol, methyl isobutylketone, etc. and of non-polar aromatic solvents such as benzene, toluene, xylene, etc. and/or aliphatic non-polar solvents such as hexane, petroleum ether, etc. may be used in proportions which are determined in each particular case.

It should be understood that my invention can be applied to any natural fats and in particular to oils of animal or vegetable origin.

The extraction of the unsaponifiable fraction of avocado oil is described below by way of non-limiting example both with regard to the fat and with regard to the operating conditions.

EXAMPLE 35 litres per hour of avocado oil and 140 litres per hour of a mixture of methanol and benzene (in the ratio of 70:30) are pumped into an extraction apparatus. The two liquids are collected at the outlet of the apparatus, the oily fraction at the bottom and the solvent fraction at the top.

The solvent fraction is partly evaporated. To the residue there are added 386.66 g. of potash, 2 litres of ethyl alcohol and 500 ml. of water per kg. of residue. The reaction mixture is heated at reflux for 4 to 5 hours and diluted to twice its volume with 3.5 litres of distilled water. The solution is then extracted with an organic solvent such as dichloroethane in a counter-current liquid-liquid extraction column in the ratio of 1 volume of solvent to 1 volume of aqueous alcoholic solution.

The solvent charged with unsaponifiable fraction is distilled under reduced pressure, the head fraction containing a little water is rejected, and the dichloroethane is then removed completely by evaporation.

The oily fraction, containing a small quantity of solvent, is recovered. The solvent is then removed completely by evaporation. The oil freed from solvent may be used as such or refined and then used for foodstuffs, cosmetics or other purposes.

The amount of triglyceride fraction recovered is 90%.

What is claimed is:
1. In a process for extracting the unsaponifiable fraction from natural fats the improvement which comprises:
   (a) the intimate contacting of the fats with a solvent mixture containing at least one polar and one non-polar solvent which will not dissolve the fatty fraction thereof;

(b) dissolving out only the unsaponifiable fraction from the fatty substance;
(c) withdrawing the solvent portion containing the unsaponifiable fraction in a liquid-liquid phase, and
(d) evaporating off the solvent thereby leaving a residue of unsaponifiable fraction.

2. Process according to claim 1, wherein the said treatment of the fat with the solvent mixture is carried out in a counter-current extractor of the liquid-liquid type.

3. Process according to claim 1, wherein the said solvent mixture is a mixture of methyl alcohol and benzene.

4. Process according to claim 3, wherein the said mixture of methyl alcohol and benzene is used for the treatment of an avocado oil.

5. The process of claim 1, wherein the polar solvent is selected from the group consisting of lower alkyl alcohols, furfural and furfurol.

6. The process of claim 1, wherein the non-polar solvent is selected from the group consisting of benzene, toluene, xylene, hexane and petroleum ether.

7. The process of claim 4, wherein the methyl alcohol-benzene mixture is present in a ratio of 30:70.

References Cited
UNITED STATES PATENTS

| | | | |
|---|---|---|---|
| 2,682,551 | 6/1954 | Miller | 260—412.8 |
| 2,730,538 | 1/1956 | Brabets et al. | 260—412.8 |
| 3,142,570 | 7/1964 | Thompson | 260—412.8 |

LEWIS GOTTS, Primary Examiner

J. R. BROWN, Assistant Examiner